United States Patent
Mo et al.

(10) Patent No.: US 9,418,259 B2
(45) Date of Patent: Aug. 16, 2016

(54) TAG TRANSMISSION APPARATUS AND SIGNAL TRANSMITTING METHOD THEREOF

(71) Applicant: ELECTRONICS AND TELECOMMUNICATIONS RESEARCH INSTITUTE, Daejeon (KR)

(72) Inventors: Sang Hyun Mo, Daejeon (KR); Ji-Hoon Bae, Daejeon (KR); Chan-Won Park, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 38 days.

(21) Appl. No.: 14/507,230

(22) Filed: Oct. 6, 2014

(65) Prior Publication Data

US 2015/0097654 A1 Apr. 9, 2015

(30) Foreign Application Priority Data

Oct. 7, 2013 (KR) .................. 10-2013-0119283
Oct. 14, 2013 (KR) .................. 10-2013-0122201
Sep. 12, 2014 (KR) .................. 10-2014-0121339

(51) Int. Cl.
*G06K 7/10* (2006.01)
*H04L 27/12* (2006.01)
(Continued)

(52) U.S. Cl.
CPC ............ *G06K 7/10009* (2013.01); *H04L 27/04* (2013.01); *H04L 27/12* (2013.01); *H04L 27/20* (2013.01)

(58) Field of Classification Search
CPC .......... G06K 19/077; G06K 19/07758; G06K 19/07779; G06K 7/10019; G06K 7/10; G06K 7/10009; G06K 27/2035; H05H 1/38; H04W 72/04; H04W 72/0453; H04L 27/12; H04L 27/20; H04L 27/2035; H04L 27/2057; H04L 72/0453; H04L 27/2614; H04L 5/0048; H04B 5/02; H04B 7/04
USPC .................................. 340/10.1–10.6
See application file for complete search history.

(56) References Cited

U.S. PATENT DOCUMENTS 5,208,678 A * 5/1993 Nakagawa ............. H04N 5/928
386/202
7,324,437 B1 * 1/2008 Czylwik ................. H04L 1/06
370/203

(Continued)

FOREIGN PATENT DOCUMENTS

KR 10-2010-0055707 A 5/2010
KR 10-2010-0073106 A 7/2010

(Continued)

OTHER PUBLICATIONS

Electronics and Telecommunications Research Institute, "Necessity of High-speed RFID technology", IoT Convergence Research Department, Dec. 13, 2013.

*Primary Examiner* — Allen T Cao
(74) *Attorney, Agent, or Firm* — Rabin & Berdo, P.C.

(57) ABSTRACT

Disclosed herein are a tag transmission apparatus and a signal transmitting method thereof. The tag transmission apparatus converts a plurality of data bits into a symbol, which is one of a plurality of symbols, and multiplies the converted symbol by a square-wave having a predetermined frequency to thereby generate a subcarrier signal. Here, in the case in which the plurality of data bits are n (n is a natural number larger than 2) bits, the number of the plurality of symbols is $2^n$.

19 Claims, 27 Drawing Sheets

(51) Int. Cl.
*H04L 27/04* (2006.01)
*H04L 27/20* (2006.01)

(56) References Cited

U.S. PATENT DOCUMENTS

| | | | | |
|---|---|---|---|---|
| 2002/0181390 | A1* | 12/2002 | Mody | H04L 1/06 370/208 |
| 2007/0263745 | A1* | 11/2007 | Hayase | H04B 7/0615 375/267 |
| 2008/0278293 | A1* | 11/2008 | Drucker | G06K 7/0008 340/10.4 |
| 2009/0252206 | A1* | 10/2009 | Rheinfelder | H03D 3/007 375/219 |
| 2012/0057656 | A1 | 3/2012 | Bae et al. | |
| 2013/0106580 | A1 | 5/2013 | Bae et al. | |
| 2013/0162401 | A1 | 6/2013 | Bae et al. | |
| 2015/0312072 | A1* | 10/2015 | Mo | H04W 72/0453 375/308 |

FOREIGN PATENT DOCUMENTS

KR 10-2013-0047561 A 5/2013
KR 10-2013-0075544 A 7/2013

\* cited by examiner

TAG TRANSMISSION APPARATUS AND SIGNAL TRANSMITTING METHOD THEREOF

CROSS-REFERENCE TO RELATED APPLICATION

This application claims priority to and the benefit of Korean Patent Application No. 10-2013-0119283, 10-2013-0122201 and 10-2014-0121339 filed in the Korean Intellectual Property Office on Oct. 7, 2013, Oct. 14, 2013 and Sep. 12, 2014, the entire contents of which are incorporated herein by reference.

BACKGROUND OF THE INVENTION (a) Field of the Invention

The present invention relates to a tag transmission apparatus and a signal transmitting method thereof.

(b) Description of the Related Art

A passive radio frequency identification (RFID) system does not have an apparatus for allowing a tag having target information to transmit power and a wireless signal. Therefore, the tag constituting the passive RFID system receives a carrier signal from a reader in a wireless environment to generate the power, and performs communications with the reader based on backscattering. Since the passive RFID system may provide information on an individual target body and the like, it may have a greater recognition distance than a barcode, it may simultaneously recognize a plurality of tags, and it has been used in various fields.

The RFID system has recently been used for part management in fields of aviation, automobile manufacturing, shipbuilding, steel production, and the like, and requires a technology for reading and writing mass data at a high speed using a tag user memory of 32 Kbyte, 64 Kbyte, or more. In addition, railway and conveyor application fields require a technology for recognizing an object which is moving at a high speed.

However, the existing passive RFID technology has a limit in satisfying the above-mentioned requirements. The most basic method for transmitting a signal at a high speed is to reduce a pulse width of the signal. Since the tag in the passive RFID system is operated by receiving energy from the reader without having self-power, as a clock speed in the tag is increased, power consumption is increased, thereby causing a drawback that the recognition distance is reduced. That is, a method of increasing a data transmission speed by reducing the pulse width of the signal may have a limit.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a tag transmission apparatus and a signal transmitting method thereof having advantages of being capable of transmitting a tag signal at a high speed.

An exemplary embodiment of the present invention provides a method of modulating and transmitting a plurality of data bits by a tag transmission apparatus. The method may include: converting the plurality of data bits into a first symbol, which is one of a plurality of symbols; multiplying the first symbol by a square-wave having a predetermined frequency to thereby generate a first subcarrier signal; and transmitting the first subcarrier signal to a reader, wherein in the case in which the plurality of data bits are n (n is a natural number larger than 2) bits, the number of the plurality of symbols may be $2^n$.

The converting of the plurality of data bits into the first symbol may include in the case in which the predetermined frequency is four times a symbol rate of the first symbol, converting two bits into the first symbol, and in the case in which the predetermined frequency is eight times the symbol rate of the first symbol, converting three bits into the first symbol.

The plurality of symbols may include $2^n/2$ first basis waveforms which are orthogonal to each other within a symbol section and second basis waveforms obtained by phase-reversing the first basis waveforms.

The first basis waveform and the second basis waveform may be orthogonal to each other.

The first subcarrier signal corresponding to each of the plurality of symbols may be distinguished according to a position at which a phase is reversed within a symbol section.

The plurality of symbols may include $2^n$ basis waveforms having positions of square-pulses different from each other, and each first subcarrier signal may have the number of phase reversal of one time.

The plurality of symbols may include basis waveforms which are $2^n$ square-pulses having cross-correlation of zero within a symbol section.

The first subcarrier signal corresponding to each of the plurality of symbols may be distinguished according to a position at which the square-pulse is present.

The first subcarrier signal may have at least one time of the number of phase reversals.

Another embodiment of the present invention provides a method of modulating and transmitting a plurality of data by a tag transmission apparatus. The method may include: converting a first data bit, which is at least two bits of the plurality of data, into a first symbol; converting a second data bit, which is at least two bits of the plurality of data into a second symbol; dividing the first symbol and the second symbol in parallel; multiplying the divided first symbol by a first subcarrier having a first frequency to thereby generate a first subcarrier signal; multiplying the divided second symbol by a second subcarrier having a second frequency to thereby generate a second subcarrier signal; transmitting the first subcarrier signal to a reader through a first antenna; and transmitting the second subcarrier signal to the reader through a second antenna.

The first frequency and the second frequency may be different frequencies from each other.

The second frequency may be two times faster than the first frequency.

The transmitting of the first subcarrier signal to the reader may include modulating the first subcarrier signal and transmitting it to the reader through the first antenna, and the transmitting of the second subcarrier signal to the reader may include modulating the second subcarrier signal and transmitting it to the reader through the second antenna.

Yet another embodiment of the present invention provides a tag transmission apparatus. The tag transmission apparatus may include: a data memory including a plurality of data bits; a bit to symbol converter converting a plurality of first data bits of the plurality of data bits into a first symbol, which is one of a plurality of symbols; a first subcarrier generator multiplying the first symbol by a first subcarrier having a first frequency to thereby generate a first subcarrier signal; and a first load modulator modulating the first subcarrier signal, wherein in the case in which the plurality of data bits are n (n is a natural number larger than 2) bits, the number of the plurality of symbols is $2^n$.

The bit to symbol converter may convert a plurality of second data bits of the plurality of data bits into a second symbol, which is one of a plurality of symbols, and the tag transmission apparatus may further include: a demultiplexer dividing the first symbol and the second symbol in parallel; a second subcarrier generator multiplying the second symbol by a second subcarrier having a second frequency to thereby generate a second subcarrier signal; and a second load modulator modulating the second subcarrier signal.

The second frequency may be two times faster than the first frequency.

The plurality of symbols may include $2^n/2$ first basis waveforms which are orthogonal to each other within a symbol section and second basis waveforms obtained by phase-reversing the first basis waveforms.

The first subcarrier signal corresponding to each of the plurality of symbols may be distinguished according to a position at which a phase is reversed within a symbol section.

The plurality of symbols may include basis waveforms which are $2^n$ square-pulses having cross-correlation of zero within a symbol section.

According to an exemplary embodiment of the present invention, the tag signal is transmitted by using a multi-dimensional signal based M-ary modulation scheme, thereby making it possible to transmit the tag signal at a high speed.

According to another exemplary embodiment of the present invention, the tag signal is transmitted with a multiplexing method using a multiple load modulator and multiple antennas, thereby making it possible to transmit the tag signal at a higher speed.

DETAILED DESCRIPTION OF THE EMBODIMENTS

Figure 1:
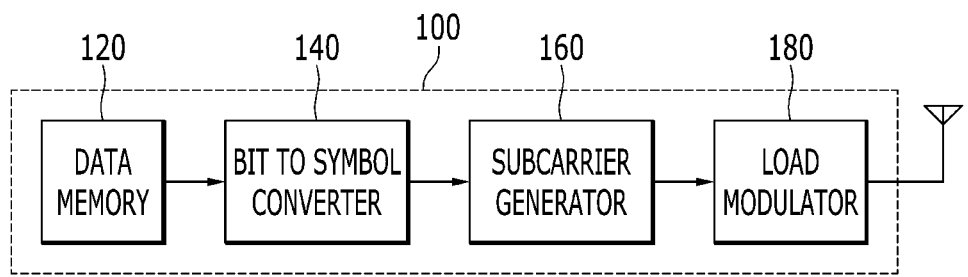
FIG. 1 is a drawing showing a tag transmission apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A tag transmission apparatus according to an exemplary embodiment of the present invention may transmit a tag signal by using a multi-dimensional signal based M-ary modulation scheme, thereby making it possible to transmit the tag signal at a high speed. Here, the tag transmission apparatus according to the exemplary embodiment of the present invention generates an M-ary bi-orthogonal modulated subcarrier (hereinafter referred to as 'M-BOM subcarrier') signal, a phase reversal encoding subcarrier (hereinafter referred to as 'PRE subcarrier') signal or a pulse position encoding subcarrier (hereinafter referred to as 'PPE subcarrier') signal, in order to achieve an M-ary modulated transmission. Hereinafter, a tag transmission apparatus and a signal transmitting method thereof according to the exemplary embodiment of the present invention will be described in detail.

FIG. 1 is a drawing showing a tag transmission apparatus according to an exemplary embodiment of the present invention.

As shown in FIG. 1, a tag transmission apparatus 100 according to an exemplary embodiment of the present invention includes a data memory 120, a bit to symbol converter 140, a subcarrier generator 160, and a load modulator 180. The tag transmission apparatus 100 according to the exemplary embodiment of the present invention shown in FIG. 1 uses a single load modulator and a single antenna.

The data memory 120 generates bit data to be transmitted. In addition, the bit to symbol converter 140 combines a plurality of bit data generated in the data memory 120 and converts it into a symbol. Meanwhile, the symbol generated from the bit to symbol converter 140 corresponds to a basis waveform to be described below.

The subcarrier generator 160 multiplies a symbol signal generated from the bit to symbol converter 140 by a square-wave signal having a predetermined frequency to thereby generate a subcarrier signal. The subcarrier generator 160 according to the exemplary embodiment of the present invention generates M-BOM subcarrier signals, PRE subcarrier signals, or PPE subcarrier signals. The M-BOM subcarrier signal, the PRE subcarrier signal, and the PPE subcarrier signal will be described below in detail.

The load modulator 180 backscatters the subcarrier signal generated from the subcarrier generator 160 through an antenna using amplitude shift keying (ASK) or phase shift keying (PSK) modulation.

Figure 2:
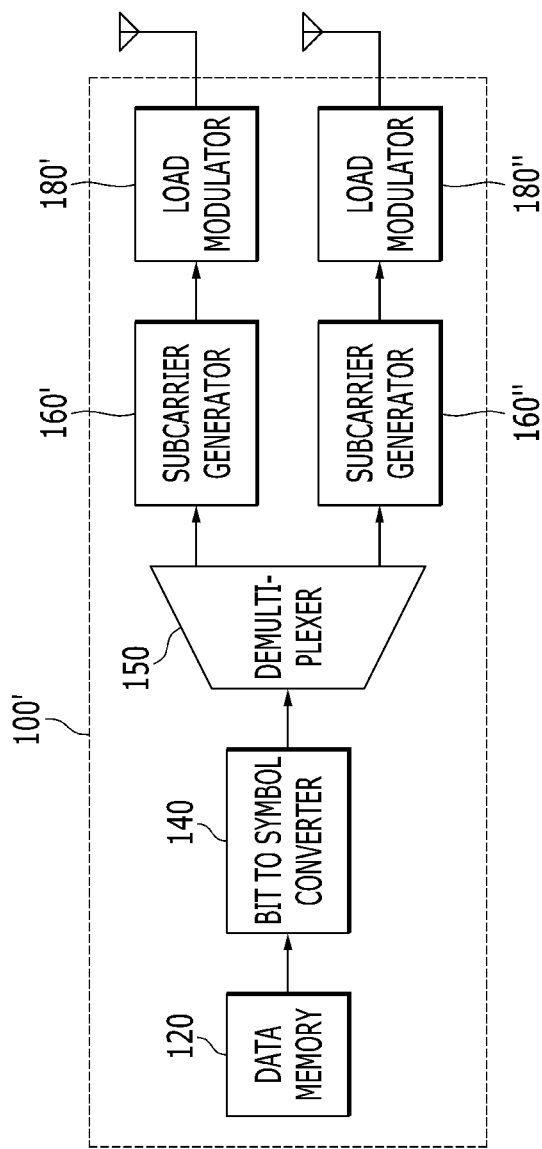
FIG. 2 is a drawing showing a tag transmission apparatus according to another exemplary embodiment of the present invention.

FIG. 2 is a drawing showing a tag transmission apparatus according to another exemplary embodiment of the present invention.

As shown in FIG. 2, a tag transmission apparatus 100' according to another exemplary embodiment of the present invention includes a data memory 120, a bit to symbol converter 140, a demultiplexer 150, two subcarrier generators 160' and 160", and two load modulators 180' and 180". The tag transmission apparatus 100' of FIG. 2 has the same configuration as the tag transmission apparatus 100 of FIG. 1 except that it further includes the demultiplexer 150 to perform multiple modulation, and has the two subcarrier generators 160' and 160" and the two load modulators 180' and 180". That is, the demultiplexer 150 divides the symbol signal generated from the bit to symbol converter 140 in parallel and the symbol signals which are respectively divided in parallel are input to the two subcarrier generators 160' and 160". Meanwhile, the subcarrier generators 160' and 160" generate M-BOM subcarrier signals, PRE subcarrier signals or PPE subcarrier signals corresponding to the symbol signals which are respectively divided in parallel.

As described above, the tag transmission apparatuses 100 and 100' according to the exemplary embodiments of the present invention encode backscattered data using the M-BOM subcarrier signal, the PRE subcarrier signal, or the PPE subcarrier signal. Hereinafter, the M-BOM subcarrier signal, the PRE subcarrier signal, or the PPE subcarrier signal will be described in detail.

First, the M-BOM subcarrier signal will be described with reference to FIGS. 3 to 6.

Figure 3:
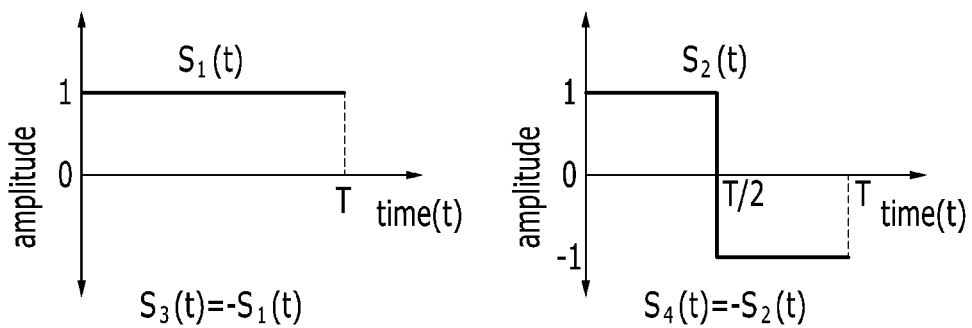
FIG. 3 is a drawing showing basis waveforms for 4-BOM subcarrier signals according to an exemplary embodiment of the present invention.
Figure 4:
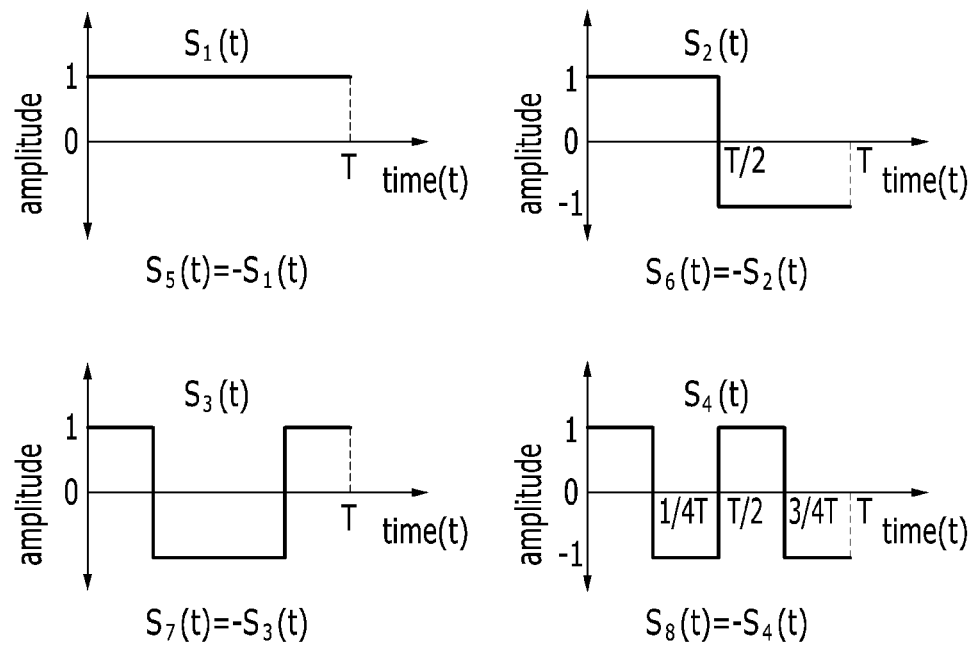
FIG. 4 is a drawing showing basis waveforms for 8-BOM subcarrier signals according to an exemplary embodiment of the present invention.

FIG. 3 is a drawing showing basis waveforms for 4-BOM subcarrier signals according to an exemplary embodiment of the present invention, and FIG. 4 is a drawing showing basis waveforms for 8-BOM subcarrier signals according to an exemplary embodiment of the present invention. That is, FIG. 3 shows the basis waveforms (symbols) for the M-BOM subcarrier signal in case of M=4 (4-ary), and FIG. 4 shows the basis waveforms (symbols) for the M-BOM subcarrier signal in case of M=8 (8-ary). The above-mentioned basis waveforms may be generated by the bit to symbol converter 140.

M basis waveforms may be expressed by a set such as the following Equation 1.

[Equation 1]

$$S_i(t) \in \{S_1(t), S_2(t), \ldots, S_{M/2}(t), -S_1(t), -S_2(t), \ldots, -S_{M/2}(t)\}$$

In Equation 1, $S_i(t)$ represents the basis waveform, that is, the symbol. First M/2 basis waveforms have characteristics which are orthogonal to each other, and other M/2 basis waveforms are generated by reversing phases of the first M/2 basis waveforms. That is, as shown in FIG. 3, $S_3(t)=-S_1(t)$ and $S_4(t)=-S_2(t)$. In addition, as shown in FIG. 4, $S_5(t)=-S_1(t)$, $S_6(t)=-S_2(t)$, $S_7(t)=-S_3(t)$, and $S_8(t)=-S_4(t)$.

Here, orthogonality satisfies a condition of the following Equation 2.

$$\int_0^T S_i(t)S_j(t) = \begin{cases} T, \text{ if } i = j \\ 0, \text{ if } i \neq j \end{cases} \quad \text{[Equation 2]}$$

Meanwhile, the subcarrier generators 160, 160', and 160" multiply the M-BOM basis waveforms mapped according to the symbol by a square-wave having a frequency corresponding to M times a symbol rate to thereby generate a final baseband transmission signal, that is, the M-BOM subcarrier signal.

Figure 5:
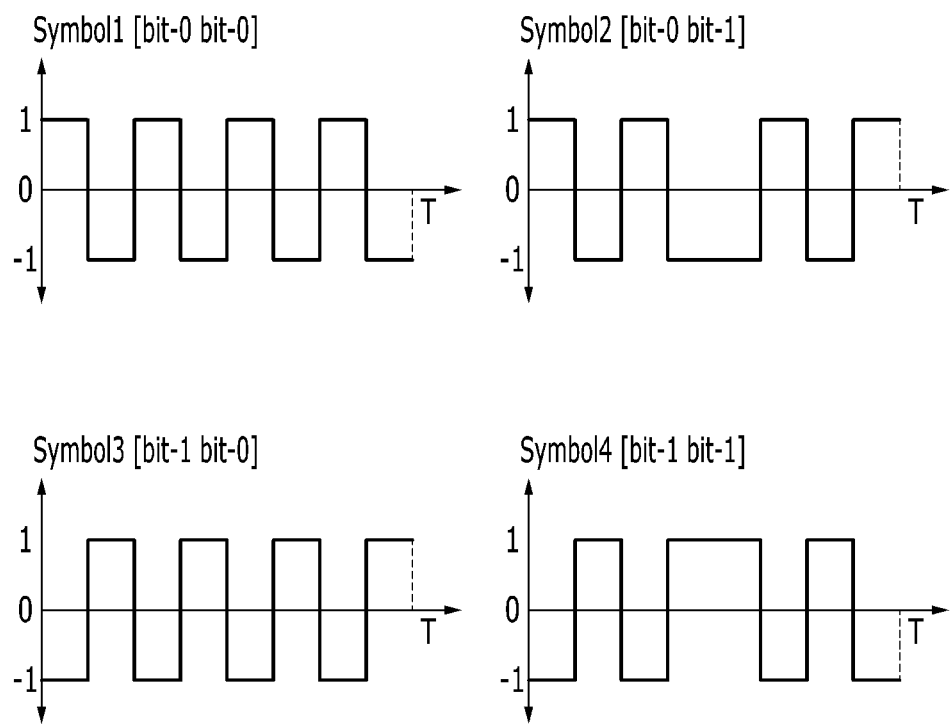
FIG. 5 is a drawing showing the 4-BOM subcarrier signals and transmission data bits corresponding thereto according to an exemplary embodiment of the present invention.
Figure 6:
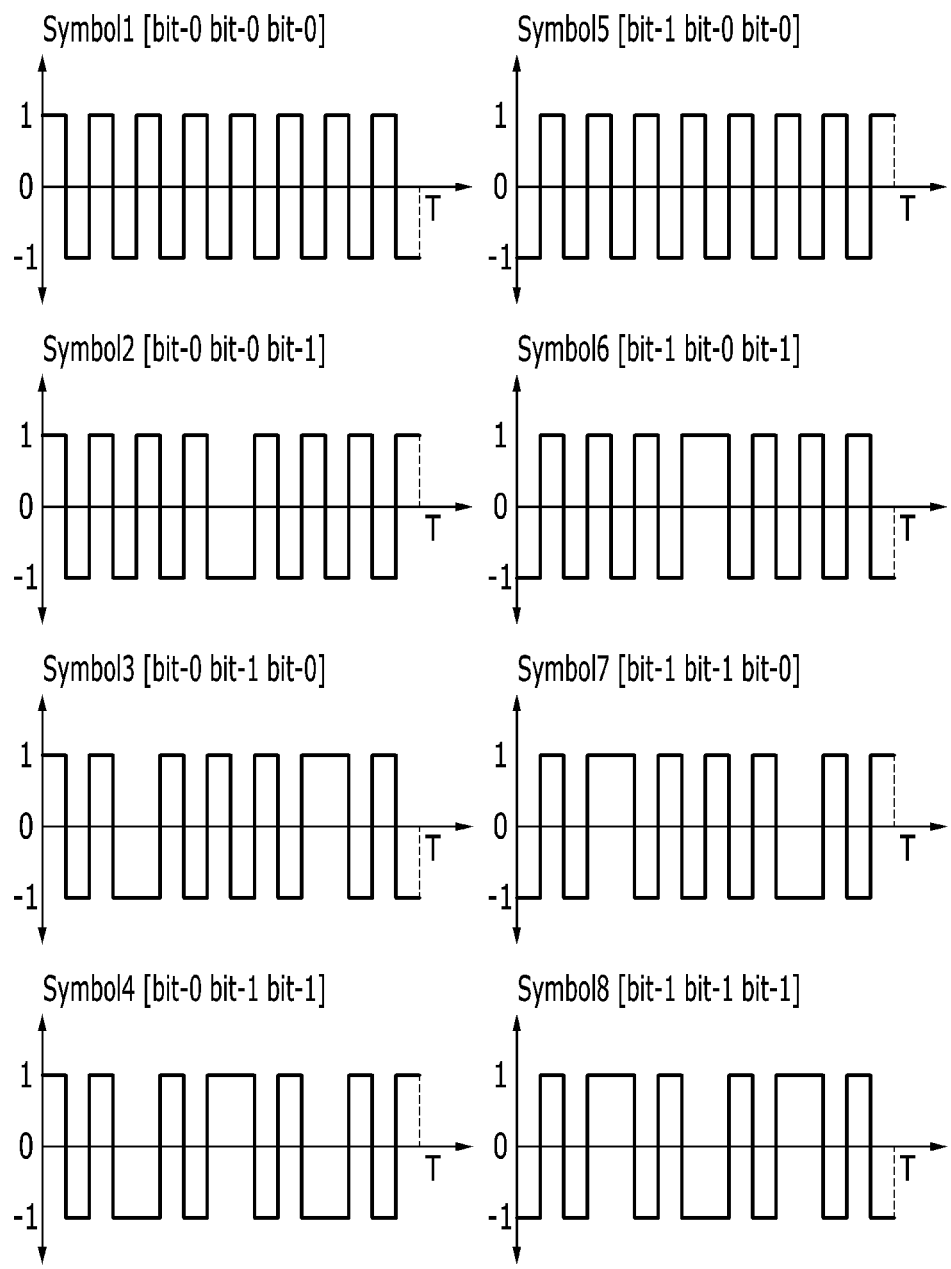
FIG. 6 is a drawing showing the 8-BOM subcarrier signals and transmission data bits corresponding thereto according to an exemplary embodiment of the present invention.

FIG. 5 is a drawing showing the 4-BOM subcarrier signals and transmission data bits corresponding thereto according to an exemplary embodiment of the present invention, and FIG. 6 is a drawing showing the 8-BOM subcarrier signals and transmission data bits corresponding thereto according to an exemplary embodiment of the present invention.

As shown in FIG. 5, the 4-BOM subcarrier signal is multiplied by the square-wave of 4 periods during a symbol section T. In addition, as shown in FIG. 6, the 8-BOM subcarrier signal is multiplied by the square-wave of 8 periods during the symbol section T. Since the M-BOM subcarrier signal according to the exemplary embodiment of the present invention does not have a direct current (DC) component, it may have a characteristic that is resistant to DC-offset noise. The 4-BOM subcarrier signal according to the exemplary embodiment of the present invention has two bits mapped per symbol, and the 8-BOM subcarrier signal according to the exemplary embodiment of the present invention has three bits mapped per symbol. The tag transmission apparatus using the M-BOM subcarrier signal according to the exemplary embodiment of the present invention may transmit data two or three times faster than an existing UHF RFID subcarrier signal. Meanwhile, although FIGS. 3 to 6 show forms having four or eight subcarrier cycles per symbol, it is possible to have another cycle.

Next, the PRE subcarrier signal will be described with reference to FIGS. 7 to 10.

Figure 7:
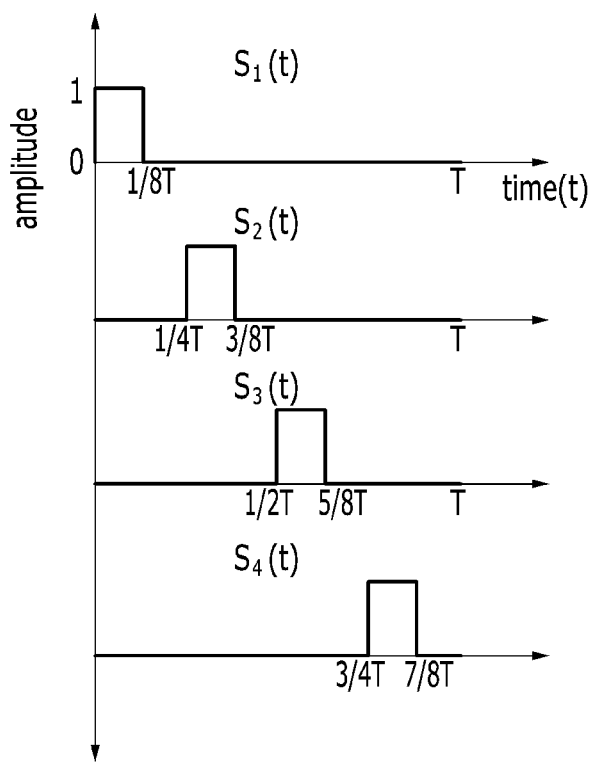
FIG. 7 is a drawing showing basis waveforms for PRE subcarrier signals in case of M=4 according to an exemplary embodiment of the present invention.
Figure 8:
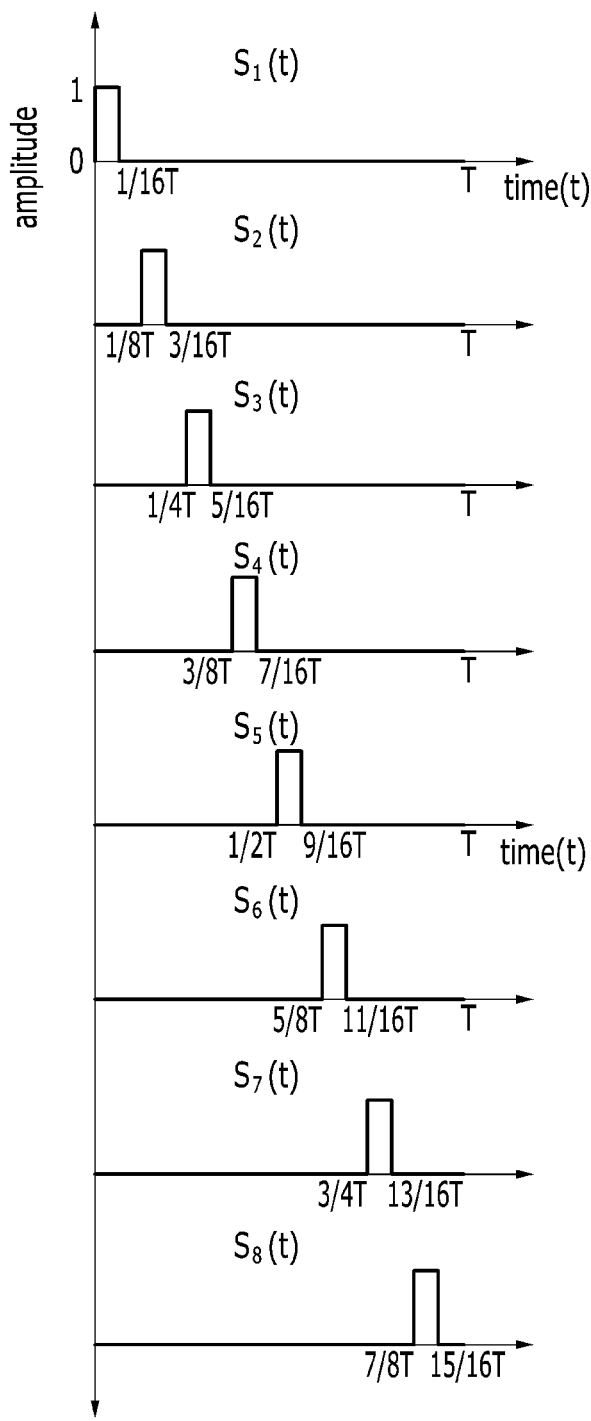
FIG. 8 is a drawing showing basis waveforms for PRE subcarrier signals in case of M=8 according to an exemplary embodiment of the present invention.

FIG. 7 is a drawing showing basis waveforms for PRE subcarrier signals in case of M=4 according to an exemplary embodiment of the present invention, and FIG. 8 is a drawing showing basis waveforms for PRE subcarrier signals in case of M=8 according to an exemplary embodiment of the present invention.

In case of 4-ary (M=4), the basis waveforms for the PRE subcarrier signal have basis waveforms as shown in FIG. 7 in order to generate phase reversals of 4 times within the symbol section T. As shown in FIG. 7, the basis waveforms ($S_1(t)$ to $S_4(t)$) respectively have square-pulses maintained during $(1/2M)*T$, and have phases different from each other.

In case of 8-ary (M=8), the basis waveforms for the PRE subcarrier signal have basis waveforms as shown in FIG. 8 in order to generate phase reversals of 8 times within the symbol section T. As shown in FIG. 8, the basis waveforms ($S_1(t)$ to $S_8t$)) respectively have square-pulses maintained during $(1/2M)*T$, and have phases different from each other.

The subcarrier generators 160, 160', and 160" multiply the PRE basis waveforms mapped according to the symbol by a square-wave having a frequency corresponding to M times a symbol rate to thereby generate a final baseband transmission signal, that is, the PRE subcarrier signal.

Figure 9:
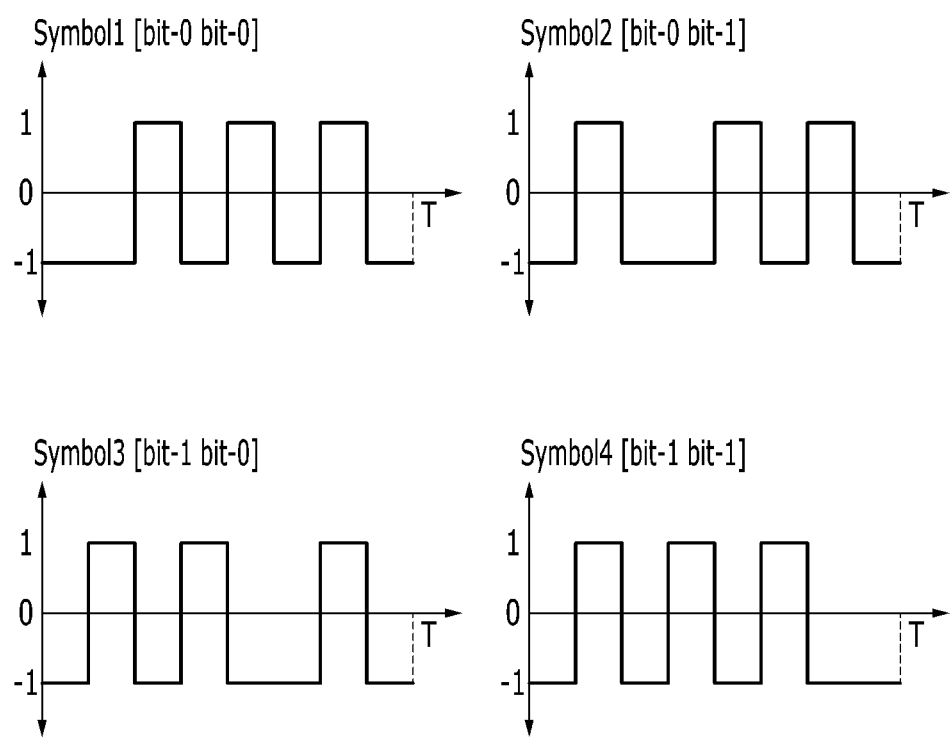
FIG. 9 is a drawing showing the PRE subcarrier signals in case of M=4 according to an exemplary embodiment of the present invention.
Figure 10:
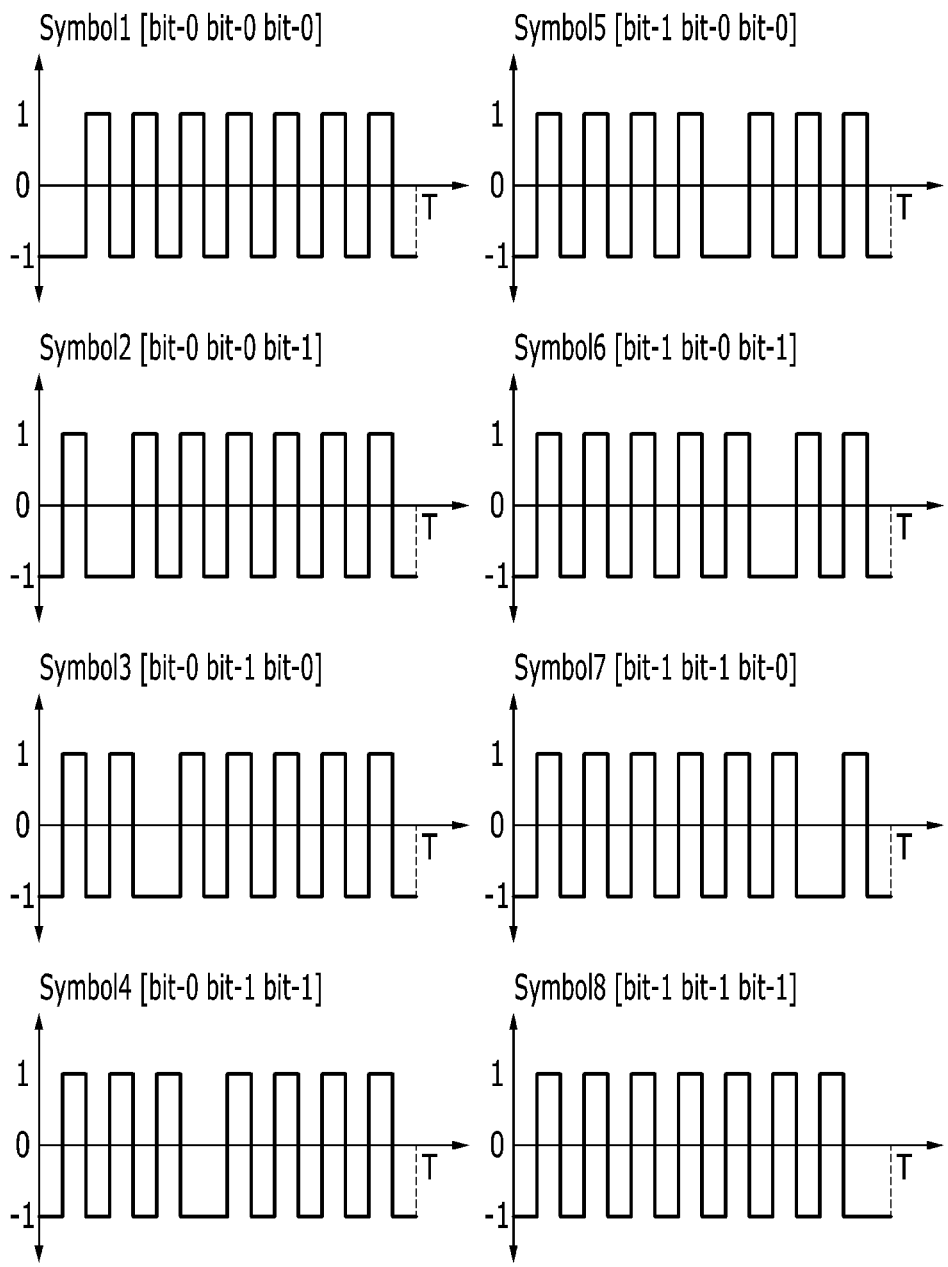
FIG. 10 is a drawing showing the PRE subcarrier signals in case of M=8 according to an exemplary embodiment of the present invention.

FIG. 9 is a drawing showing the PRE subcarrier signals in case of M=4 according to an exemplary embodiment of the present invention, and FIG. 10 is a drawing showing the PRE subcarrier signals in case of M=8 according to an exemplary embodiment of the present invention.

In case of M=4 (4-ary), if the basis waveforms as shown in FIG. 7 are multiplied by a square-wave having a frequency corresponding to four times a symbol rate, then the PRE subcarrier signals as shown in FIG. 9 are generated. In addition, in case of M=8 (8-ary), if the basis waveforms as shown in FIG. 8 are multiplied by a square-wave having a frequency corresponding to eight times the symbol rate, then the PRE subcarrier signals as shown in FIG. 10 are generated.

Referring to FIGS. 9 and 10, characteristics of the PRE subcarrier signals are different for each symbol at a position at which a subcarrier phase is reversed within a symbol section T, that is, at a position at which a phase reversal is generated. In other words, the PRE subcarrier signal has the symbol classified according to the position at which the subcarrier phase is reversed within the symbol section T. As shown in FIG. 9, Symbol 1 is mapped to a bit of '00', Symbol 2 is mapped to a bit of '01', Symbol 3 is mapped to a bit of '10', and Symbol 4 is mapped to a bit of '11'. In addition, as shown in FIG. 10, three bits may be mapped by eight symbols (Symbol 1 to Symbol 8). The tag transmission apparatus using the PRE subcarrier signal according to the exemplary embodiment of the present invention may transmit data two or three times faster than an existing UHF RFID subcarrier signal.

The PPE subcarrier signal will be described with reference to FIGS. 11 to 14.

Figure 11:
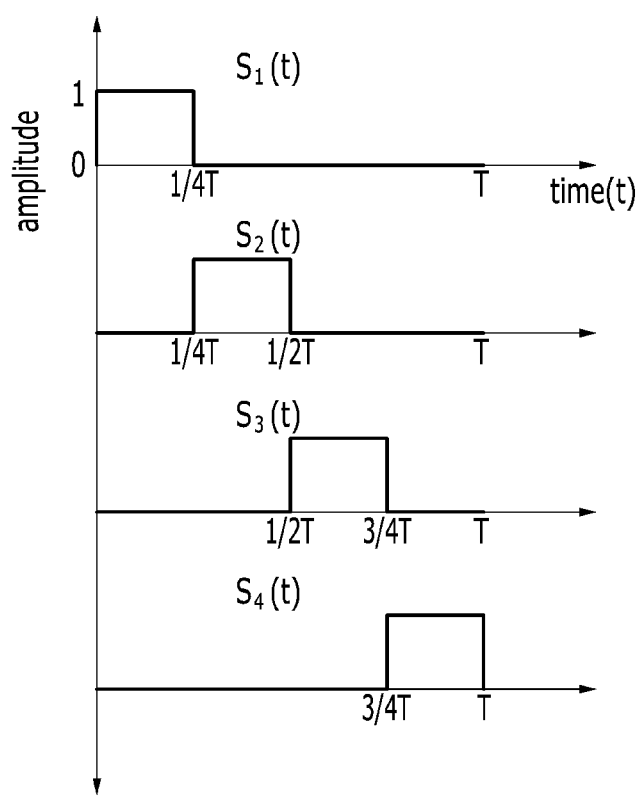
FIG. 11 is a drawing showing the basis waveforms for PPE subcarrier signals in case of M=4 according to an exemplary embodiment of the present invention.
Figure 12:
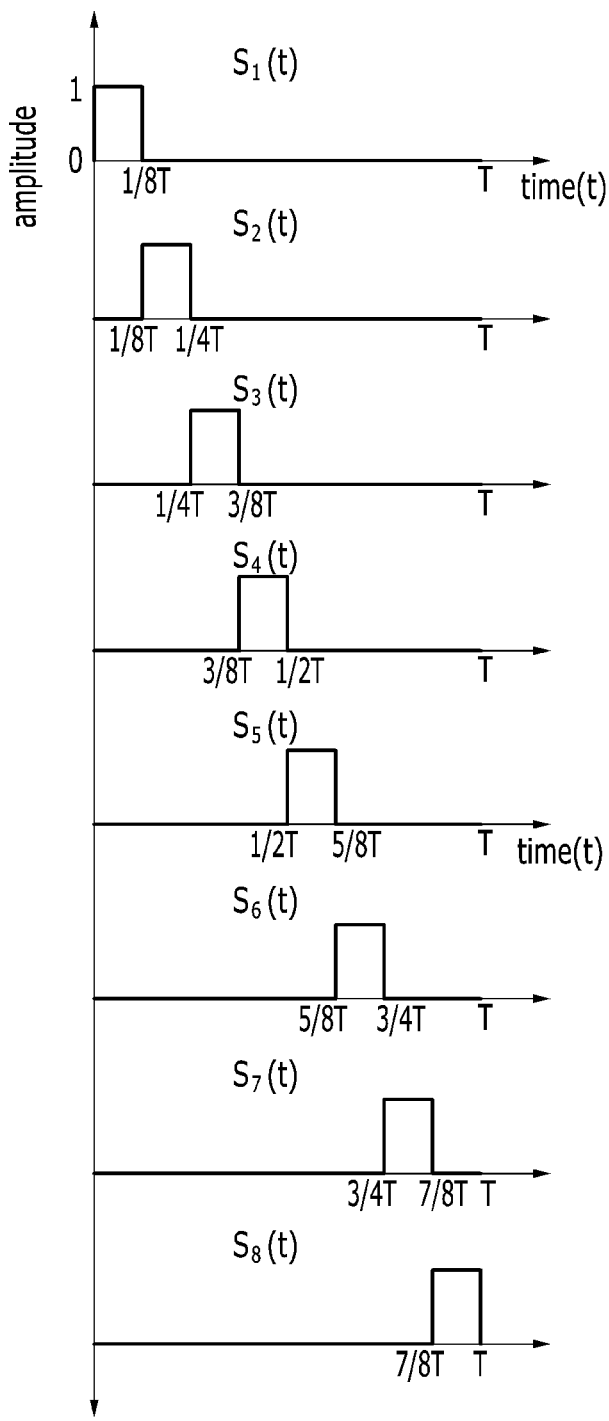
FIG. 12 is a drawing showing the basis waveforms for PPE subcarrier signals in case of M=8 according to an exemplary embodiment of the present invention.

FIG. 11 shows the basis waveforms for PPE subcarrier signals in case of M=4 according to an exemplary embodiment of the present invention, and FIG. 12 is a drawing showing the basis waveforms for PPE subcarrier signals in case of M=8 according to an exemplary embodiment of the present invention.

Figure 13:
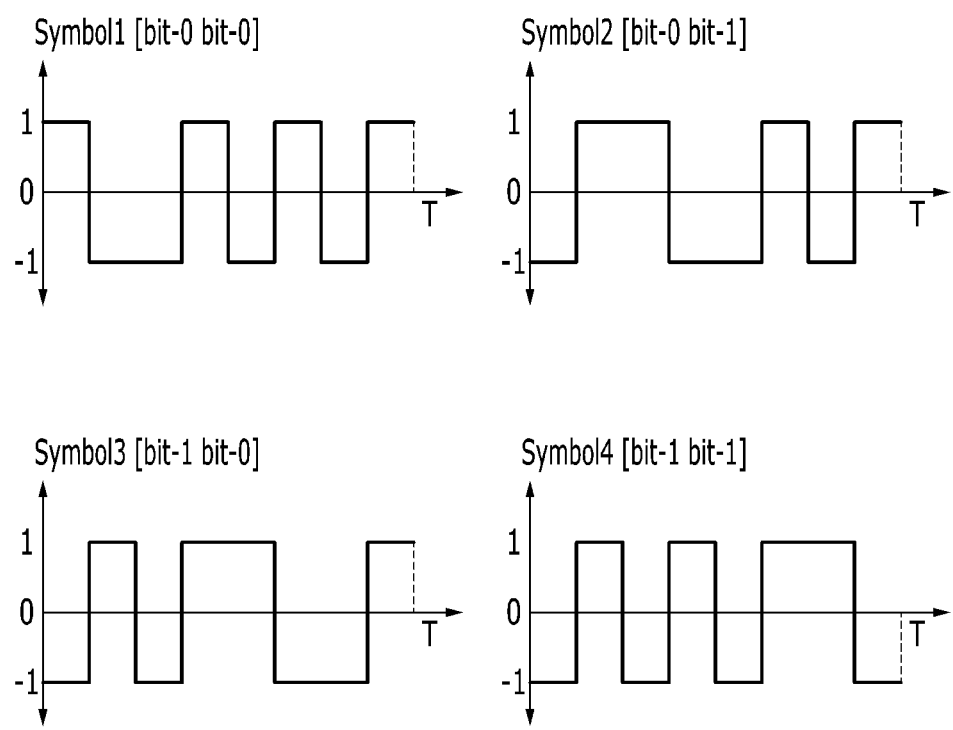
FIG. 13 is a drawing showing the PPE subcarrier signals in case of M=4 according to an exemplary embodiment of the present invention.
Figure 14:
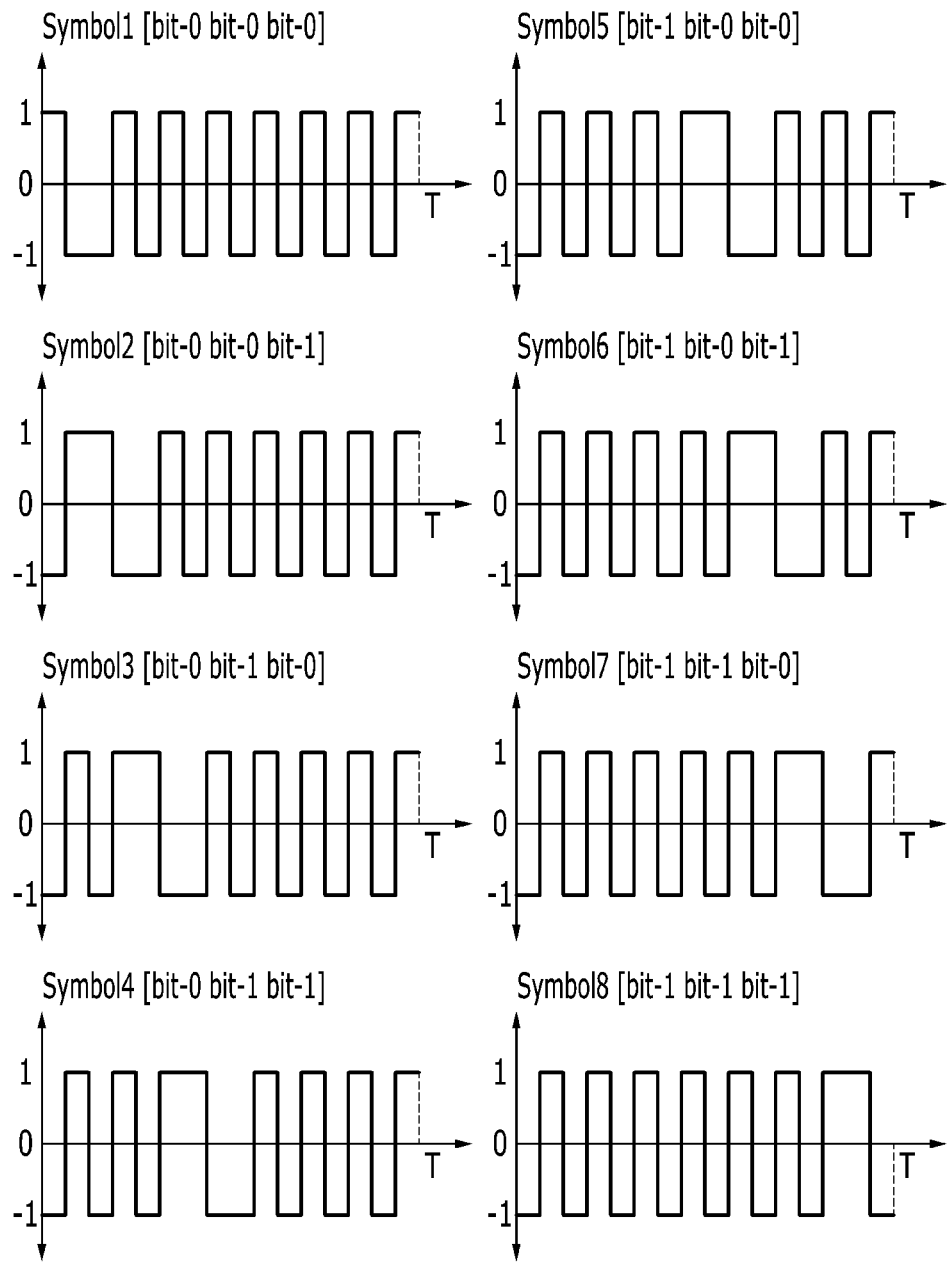
FIG. 14 is a drawing showing the PPE subcarrier signals in case of M=8 according to an exemplary embodiment of the present invention.

FIG. 13 is a drawing showing the PPE subcarrier signals in case of M=4 according to an exemplary embodiment of the present invention, and FIG. 14 is a drawing showing the PPE subcarrier signals in case of M=8 according to an exemplary embodiment of the present invention.

As shown in FIGS. 11 and 12, the basis waveform for the PPE subcarrier has a symbol determined according to the position where the square-pulse is present within the symbol section T. As shown in FIG. 11, the symbol section T is divided into four equal parts, such that four symbols ($S_1(t)$ to $S_4(t)$) are determined according to the positions at which the square-pulse is generated. In addition, as shown in FIG. 12, the symbol section T is divided into eight equal parts, such that eight symbols ($S_1(t)$ to $S_8(t)$) are determined according to the positions at which the square-pulse is generated. Here, the symbols (the basis waveforms) shown in FIGS. 11 and 12 have a cross-correlation of zero between different symbols during the symbol section T, thereby having characteristics orthogonal to each other.

Meanwhile, in the case in which the basis waveforms (symbols) shown in FIGS. 11 and 12 are applied to the RFID system as is, a signal transmitted from a transmitter of the reader may leak into a receiver of the reader. DC-offset noise may occur due to the above-mentioned leakage signal upon demodulating a tag signal received from the tag transmission apparatus, and performance degradation may occur upon demodulating a signal including the DC-offset noise. In order to solve the above-mentioned problems, as shown in FIGS. 13 and 14, the subcarrier generators 160, 160', and 160" multiply the PPE basis waveforms (symbols) by a subcarrier cycle, thereby generating the PPE subcarrier signals. That is, the subcarrier generators 160, 160', and 160" multiply the PPE basis waveforms (the basis waveforms of FIGS. 11 and 12) mapped according to the symbol by a square-wave having a frequency corresponding to M times a symbol rate to thereby generate a final baseband transmission signal, that is, the PPE subcarrier signal.

The PRE subcarrier signals shown in FIGS. 9 and 10 have one phase reversal generated within the symbol section T. Meanwhile, the PPE subcarrier signals shown in FIGS. 13 and 14 have at least one phase reversal generated within the symbol section T. As shown in FIG. 13, Symbol 1 and Symbol 4 have one phase reversal which is generated, and Symbol 2 and Symbol 3 have two phase reversals which are generated. In addition, the PPE subcarrier signal may also transmit data faster by two or three times than an existing UHF RFID subcarrier signal, equal to the PRE subcarrier signal.

Table

Table 1 shows data rates of the tag in the case in which the tag transmission apparatus according to the exemplary embodiment of the present invention encodes backscattering data using the M-BOM subcarrier signals. That is, Table 1 shows a modulation type, the number of transmission antennas, and the data rate of the tag according to a link frequency. When the data is transmitted by using the two load modulators and through the two antennas as in the tag transmission apparatus 100' of FIG. 2, data may be transmitted at a maximum rate of 1.05 Mbps, which is excellent compared to the existing UHF RFID transmission speed. Meanwhile, although Table 1 shows a case of the M-BOM subcarriers, the present invention may be equally applied to cases of the PRE subcarriers and the PPE subcarriers.

| Modulation type | Number of tx. antenna | Link frequency (kHz) | Data rate (kbit/s) |
|---|---|---|---|
| 4-BOM | 1 | 300/600/900/1200 | 150/300/450/600 |
| 8-BOM | 1 | 300/600/900/1200 | 112.5/225/337.5/450 |
| 4-BOM + 4-BOM (high-speed mode) | 2 | 4-BOM subcarrier1: 600<br>4-BOM subcarrier2: 1200 | 900 |
|  |  | 4-BOM subcarrier1: 900<br>4-BOM subcarrier2: 1200 | 1050 |
| 8-BOM + 8-BOM (high-speed mode) | 2 | 8-BOM subcarrier1: 600<br>8-BOM subcarrier2: 1200 | 675 |
|  |  | 8-BOM subcarrier1: 900<br>8-BOM subcarrier2: 1200 | 787.5 |

Hereinafter, a method of transmitting a tag signal using the M-BOM subcarrier signal, the PRE subcarrier signal or the PPE subcarrier signal as described above will be described with reference to FIGS. 15 and 16.

Figure 15:
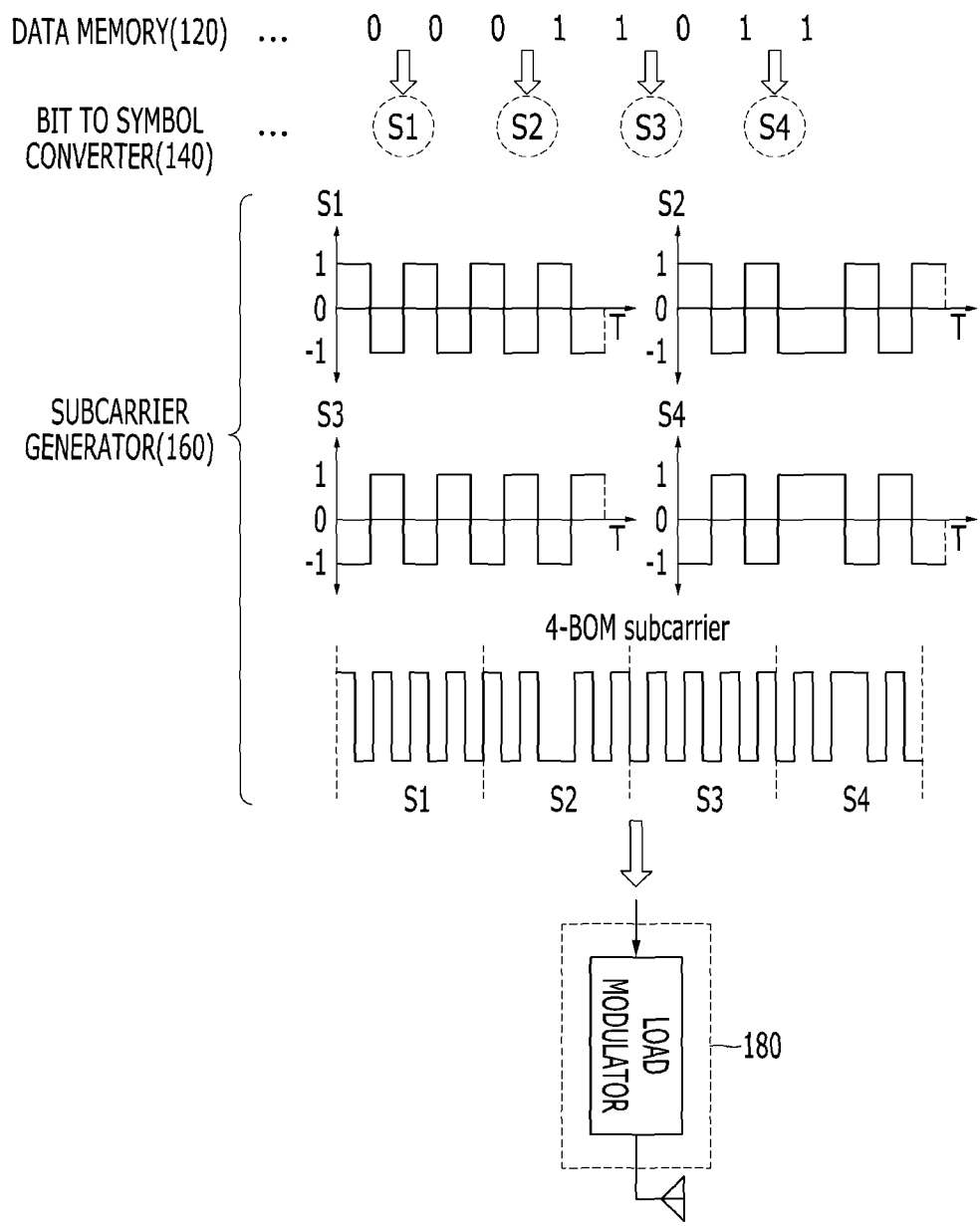
FIG. 15 is a drawing showing a method of transmitting a tag signal using one 4-BOM subcarrier signal.

FIG. 15 is a drawing showing a method of transmitting a tag signal using one 4-BOM subcarrier signal. That is, FIG. 15 is a drawing showing the method in which the tag transmission apparatus 100 of FIG. 1 generates the 4-BOM subcarrier signal and then transmits the tag signal using one load modulator and one antenna.

First, data in the data memory 120 is mapped to one symbol per two bits. That is, the bit to symbol converter 140 maps each two bits to one symbol (S1 to S4), thereby generating the 4-BOM basis waveforms as in FIG. 3. The subcarrier generator 160 multiplies the 4-BOM basis waveform by the square-wave having four periods to thereby finally generate the 4-BOM subcarrier signal. The subcarrier signals generated as described above are transmitted to the reader of the RFID system through the load modulator 180.

Figure 16:
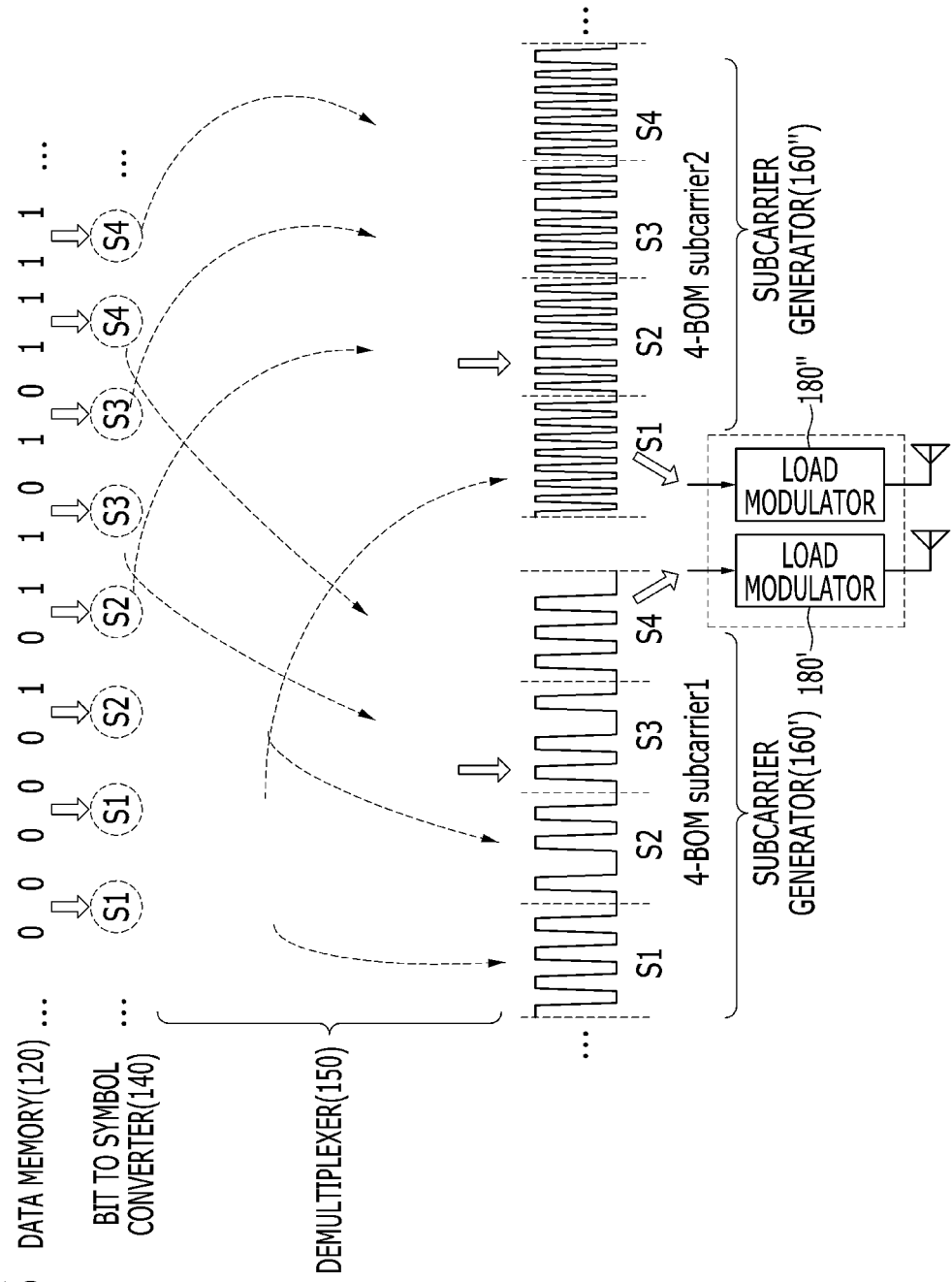
FIG. 16 is a drawing showing a method of transmitting a tag signal using two 4-BOM subcarrier signals.

FIG. 16 is a drawing showing a method of transmitting a tag signal using two 4-BOM subcarrier signals. That is, FIG. 16 is a drawing showing the method in which the tag transmission apparatus 100' of FIG. 2 generates the 4-BOM subcarrier signal in the multiplexing scheme and then transmits the tag signal using two load modulators and two antennas.

Data in the data memory 120 is mapped to one symbol per two bits. That is, the bit to symbol converter 140 maps each two bits to one symbol (S1 to S4), thereby generating the 4-BOM basis waveforms as in FIG. 3. The demultiplexer 150 multiplexes the mapped symbol and divides it in parallel, and the symbols divided in parallel are transmitted to the subcarrier generator 160' and the subcarrier generator 160", respectively. The subcarrier generator 160' multiplies the 4-BOM basis waveform by the square-wave having a first link frequency to thereby finally generate a subcarrier 1 (4-BOM subcarrier 1) signal. Meanwhile, the subcarrier generator 160" also multiplies the 4-BOM basis waveform by the square-wave having a second link frequency to thereby finally generate a subcarrier 2 (4-BOM subcarrier 2) signal. The first link frequency and the second link frequency are different from each other, and as shown in FIG. 16, the first link frequency may have four periods and the second link frequency may have eight periods. In the case in which the subcarrier 2 (4-BOM subcarrier 2) is generated using a link frequency that is faster by two times than the subcarrier 1 (4-BOM subcarrier 1) as shown in FIG. 16, orthogonality is also satisfied between two subcarrier signals. Therefore, even in the case in which the reader receives the two subcarrier signals, performance degradation due to mutual interference may not be present.

Although FIGS. 15 and 16 show only the method of transmitting the tag signal using the 4-BOM subcarrier signal for convenience of explanation, the present invention may be equally applied to a case of the 8-BOM subcarrier signal, the PRE subcarrier signal, or the PPE subcarrier signal.

Hereinafter, a method of generating a tag preamble using the M-BOM subcarrier signal, the PRE subcarrier signal, or the PPE subcarrier signal as described above will be described.

Figure 17:
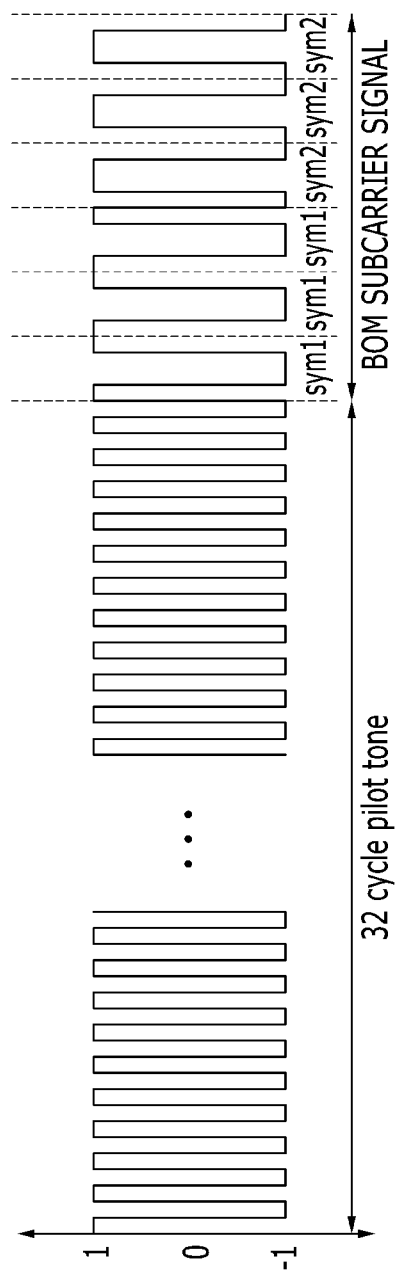
FIG. 17 is a drawing showing a tag preamble structure using M-BOM subcarrier signals according to an exemplary embodiment of the present invention.

FIG. 17 is a drawing showing a tag preamble structure using M-BOM subcarrier signals according to an exemplary embodiment of the present invention.

As shown in FIG. 17, the tag preamble includes a pilot tone and six symbols (Sym1, Sym1, Sym1, Sym2, Sym2, and Sym2). Here, the six symbols are generated in the case of M=2 in the M-BOM subcarrier scheme described in FIGS. 3 to 6, that is, the 2-BOM subcarrier scheme.

A pilot tone including a periodic square-wave is positioned at a start portion of the preamble. The number of repeating times of the square-wave may be 32 as shown in FIG. 17, but the number of times may be increased or decreased. Since the pilot tone signal has a frequency proportional to the transmission speed of the tag signal, the reader may measure the frequency of the pilot tone signal to thereby estimate the transmission speed of the tag signal. In addition, the reader may calculate a difference between a previous signal and a current signal using the pilot tone signal to thereby compensate for the DC offset.

Meanwhile, the preamble signal serves to notify a start point of an actual information signal. To this end, the preamble includes a code sequence generated using a plurality of symbols, and the preamble is detected by correlation characteristics which are included in a code. Therefore, when a specific symbol combination configuring the preamble is determined, autocorrelation characteristics are importantly considered.

Figure 18:
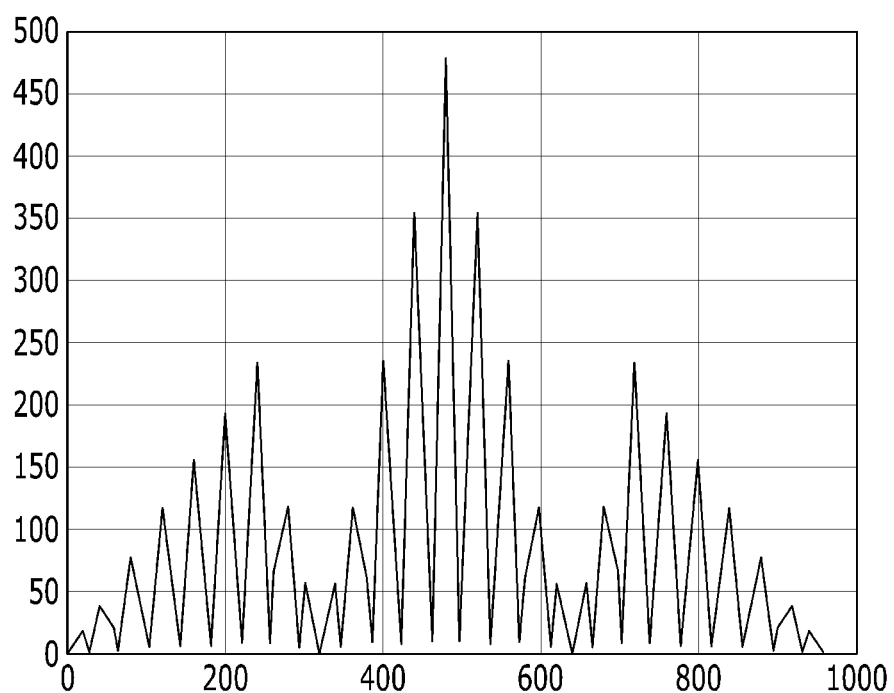
FIG. 18 is a drawing showing autocorrelation characteristic in the case in which a preamble sequence of FIG. 17 is used.

FIG. 18 is a drawing showing an autocorrelation characteristic in the case in which a preamble sequence of FIG. 17 is used. That is, FIG. 18 shows the autocorrelation characteristic of a case in which the six symbols (Sym1, Sym1, Sym1, Sym2, Sym2, and Sym2) generated in the 2-BOM subcarrier scheme are used as the preamble sequences.

As shown in FIG. 18, it may be appreciated that since a first peak value is about 500 and a second peak value is about 350, the first peak value and the second peak value are well distinguished from each other.

Figure 19:
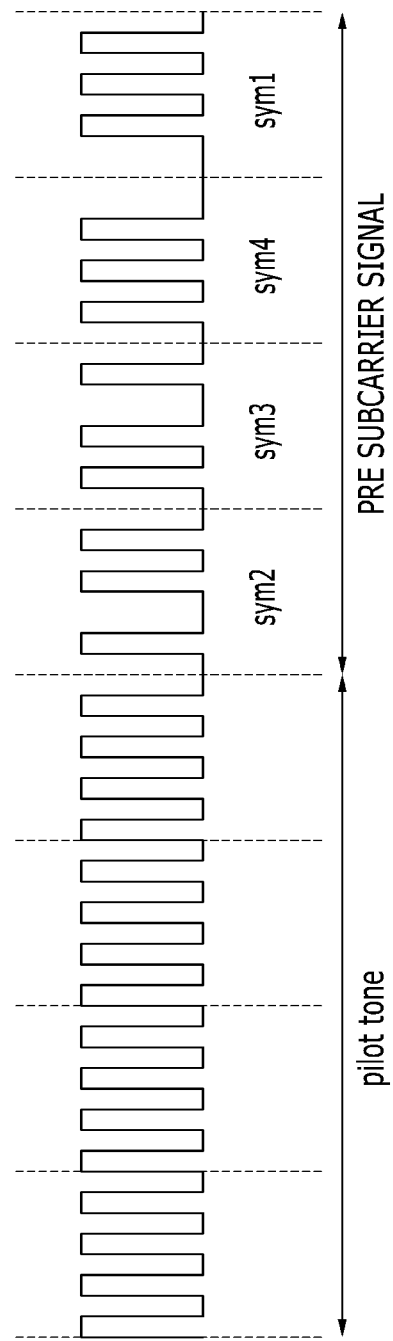
FIG. 19 is a drawing showing a tag preamble structure using PRE subcarrier signals according to an exemplary embodiment of the present invention.

FIG. 19 is a drawing showing a tag preamble structure using PRE subcarrier signals according to an exemplary embodiment of the present invention.

As shown in FIG. 19, the tag preamble includes a pilot tone and four symbols (Sym2, Sym3, Sym4, and Sym1). Here, the four symbols are generated in the PRE subcarrier scheme of the case of M=4 in the PRE subcarrier scheme described in FIGS. 7 to 10.

The preamble sequences (Sym2, Sym3, Sym4, and Sym1) shown in FIG. 19 have an excellent autocorrelation characteristic and may accurately detect the start point of tag information.

Figure 20:
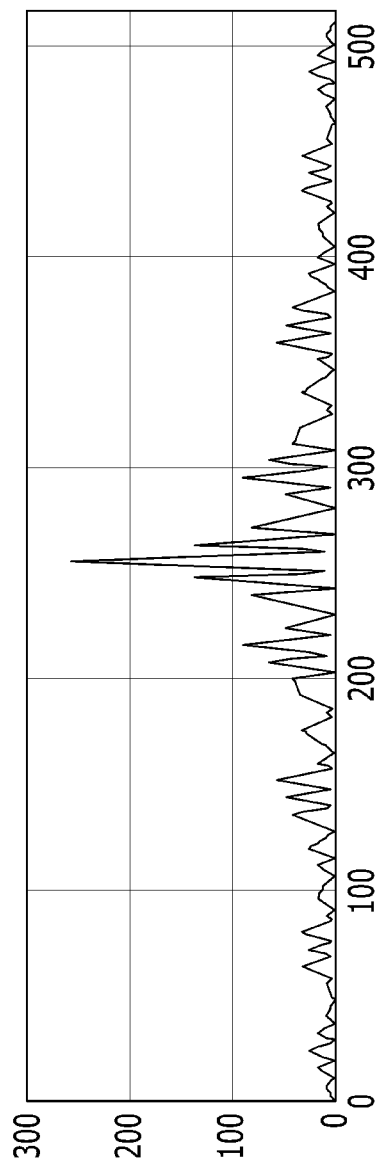
FIG. 20 is a drawing showing autocorrelation characteristics in the case in which preamble sequences of FIG. 19 are used.

FIG. 20 is a drawing showing autocorrelation characteristics in the case in which the preamble sequences of FIG. 19 are used. That is, FIG. 20 shows the autocorrelation characteristics of a case in which the four symbols (Sym2, Sym3, Sym4, and Sym1) generated in the PRE subcarrier scheme are used as the preamble sequences.

As shown in FIG. 20, it may be appreciated that since a first peak value is about 250 and a second peak value is about 90 in an environment in which an offset of the transmission speed is not present and noise is not present, the first peak value and the second peak value are well distinguished from each other. Therefore, the reader may detect whether or not the tag signal is present with accurate timing upon receiving the transmission signal.

Figure 21:
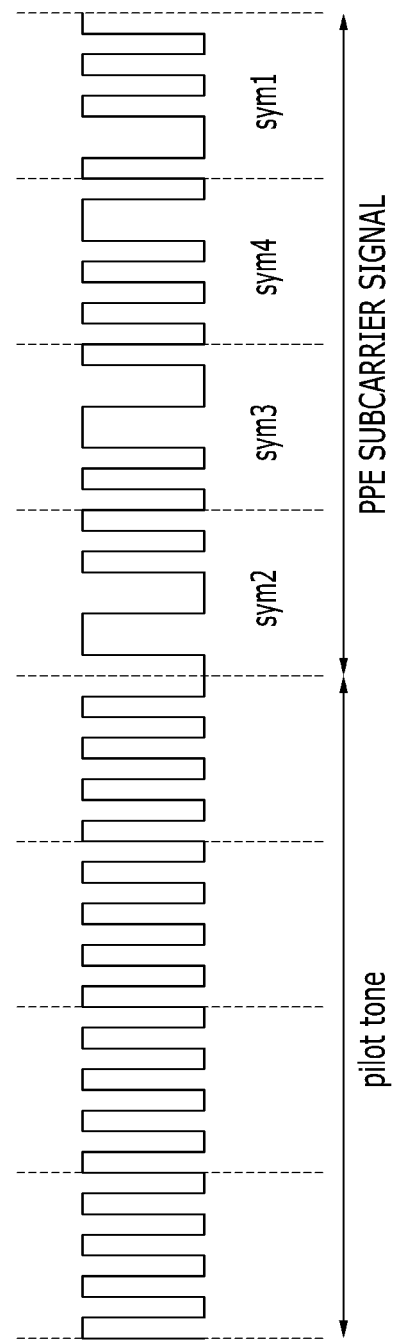
FIG. 21 is a drawing showing a tag preamble structure using PPE subcarrier signals according to an exemplary embodiment of the present invention.

FIG. 21 is a drawing showing a tag preamble structure using PPE subcarrier signals according to an exemplary embodiment of the present invention.

As shown in FIG. 21, the tag preamble using the PPE scheme includes a pilot tone and four symbols (Sym2, Sym3, Sym4, and Sym1). Here, the four symbols are generated in the PPE subcarrier scheme of the case of M=4 in the PPE subcarrier scheme described in FIGS. 11 to 14.

Figure 22:
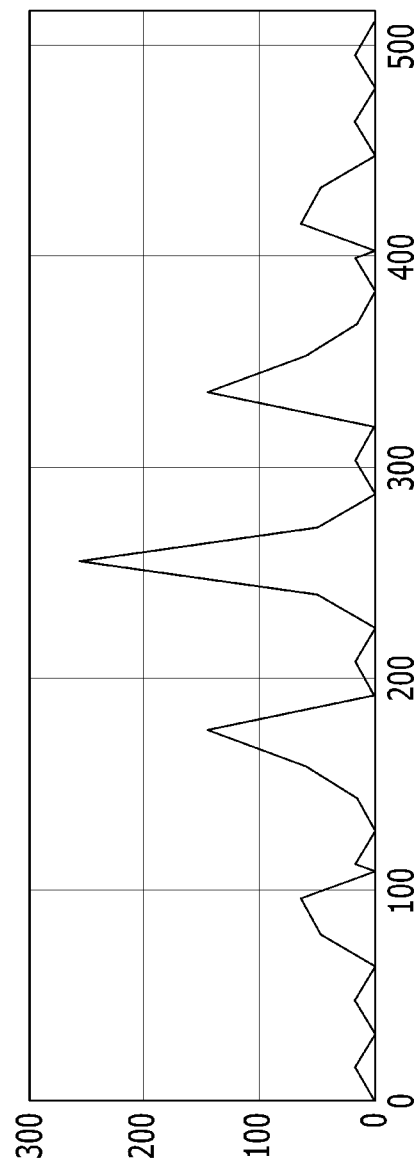
FIG. 22 is a drawing showing autocorrelation characteristics in the case in which preamble sequences of FIG. 21 are used.

FIG. 22 is a drawing showing autocorrelation characteristics in the case in which preamble sequences of FIG. 21 are used. As shown in FIG. 22, it may be appreciated that since the first peak value and the second peak value are well distinguished, autocorrelation characteristics are excellent.

Next, a method of configuring a preamble using a pseudo noise (PN) code will be described. The PN code is a code sequence having a constant rule while having a noise characteristic similar to a random sequence. Accordingly, since the PN code has sharp autocorrelation and low cross-correlation characteristics, it is advantageous to perform initial synchronization. A length of the PN code is defined as $L=2^m-1$, and the following exemplary embodiment of the present invention shows cases of m=3 and 4 for convenience of explanation.

Figure 23:
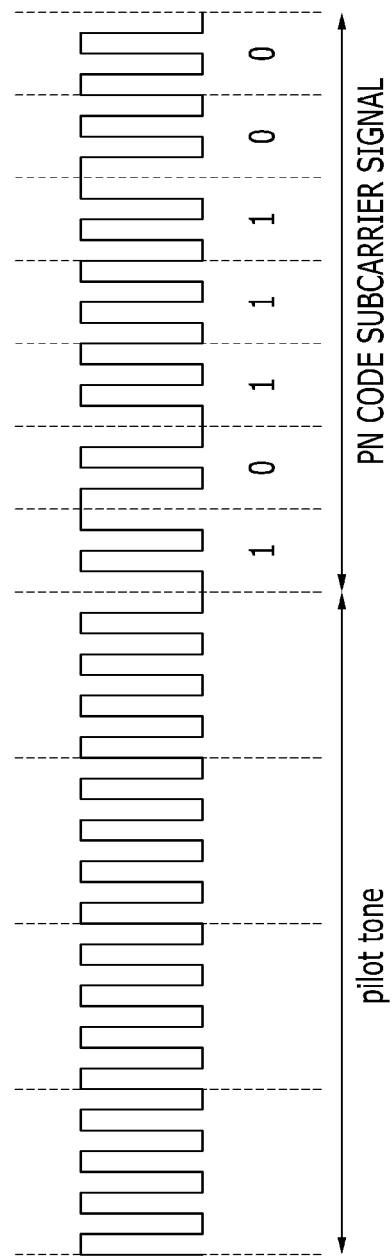
FIG. 23 is a drawing showing a preamble structure in which a PN code having a length of 7 is used.
Figure 24:
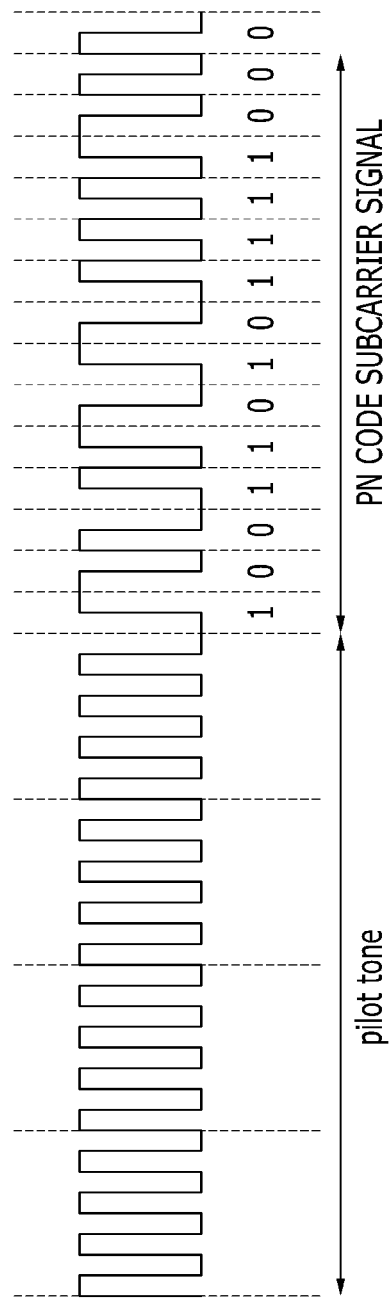
FIG. 24 is a drawing showing a preamble structure in which a PN code having a length of 15 is used.

FIG. 23 is a drawing showing a preamble structure in which a PN code having a length of 7 is used, and FIG. 24 is a drawing showing a preamble structure in which a PN code having a length of 15 is used.

In FIG. 23, a polynomial expression used to generate the PN code is $f(x)=x^3+x^2+1$, and an initial value is 0x1. In this case, an output of a PN code generator is (1, 0, 1, 1, 1, 0, 0). If the PN code generated as described above is multiplied by the subcarrier, then a PN code subcarrier signal is finally generated. The subcarrier multiplied by the PN code may become one period of the square-wave and may become a period longer than the one period. FIG. 23 shows a preamble configuration of a case in which the code is allocated by one bit per two periods of the square-wave.

In FIG. 24, a polynomial expression used to generate the PN code is $f(x)=x^4+x^3+1$, and an initial value is 0x01. In this case, as an output of a PN code generator (1, 0, 0, 1, 1, 0, 1, 0, 1, 1, 1, 1, 0, 0, 0) is generated, and the subcarrier multiplied by the PN code is one period of the square-wave.

Figure 25:
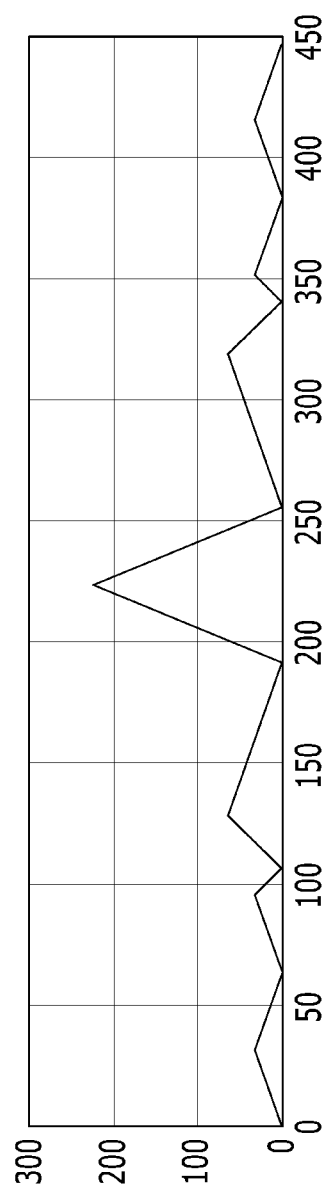
FIG. 25 is a drawing showing autocorrelation characteristics in the case in which preamble sequences of FIG. 23 are used.
Figure 26:
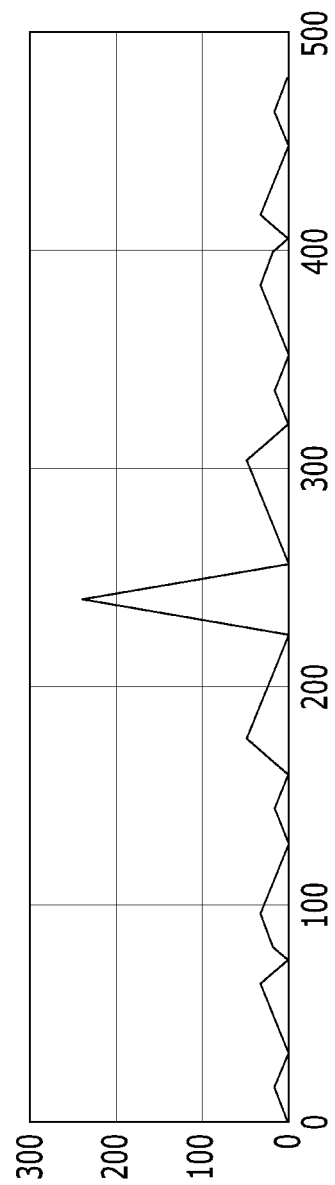
FIG. 26 is a drawing showing autocorrelation characteristics in the case in which preamble sequences of FIG. 24 are used.

FIG. 25 is a drawing showing autocorrelation characteristics in the case in which preamble sequences of FIG. 23 are used, and FIG. 26 is a drawing showing autocorrelation characteristics in the case in which preamble sequences of FIG. 24 are used.

It may be appreciated that the autocorrelation characteristics are excellent in case of configuring the preamble using the PN code as shown in FIGS. 25 and 26. Since a first peak value and a second peak value have a difference of three times therebetween, the reader may detect whether or not the tag signal is present with accurate timing.

Figure 27:
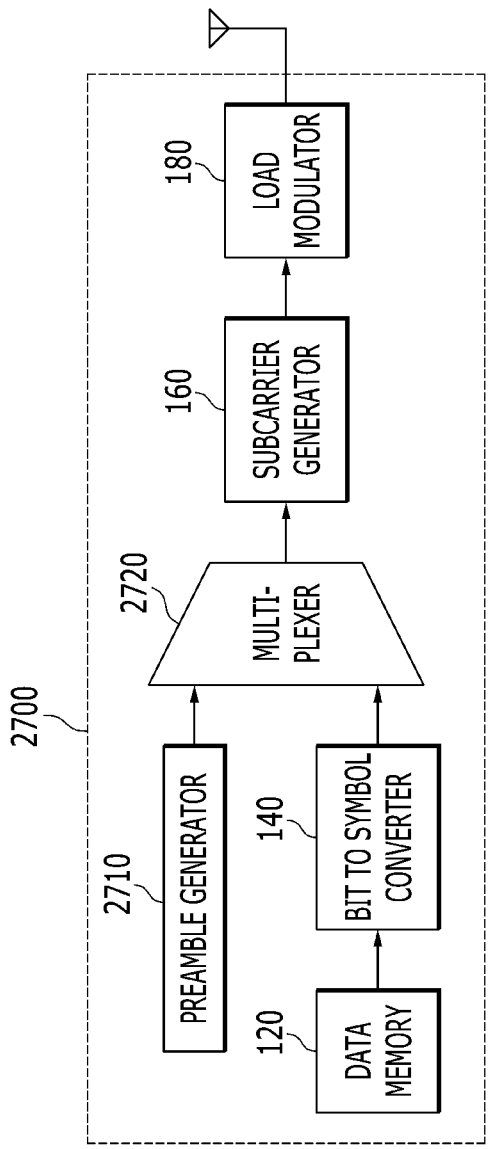
FIG. 27 is a drawing showing a tag transmission apparatus according to still another exemplary embodiment of the present invention.

FIG. 27 is a drawing showing a tag transmission apparatus according to still another exemplary embodiment of the present invention. That is, FIG. 27 is a drawing showing the tag transmission apparatus for cases in which the preamble is generated in the M-BOM scheme, the PRE scheme, or the PPE scheme as described above.

As shown in FIG. 27, since a tag transmission apparatus 2700 has the same components as the tag transmission apparatus 100 of FIG. 1, except for a preamble generator 2710 and a multiplexer 2720, a description of overlapped portions will be omitted.

The preamble generator 2710 generates a symbol (basis waveform) to be used as a preamble. That is, the preamble generator 2710 generates the basis waveform corresponding to the M-BOM scheme, the PRE scheme, or the PPE scheme. For example, in case of the M-BOM scheme, the preamble generator 2710 generates an M-BOM basis waveform corresponding to the symbol of FIG. 17.

The multiplexer 2720 determines whether a packet is in a preamble region or a payload region (i.e., a data region) to thereby select one of the two regions. In addition, the subcarrier generator 160 multiplies the symbol by the subcarrier to thereby generate the M-BOM subcarrier signal, the PRE subcarrier signal, or the PPE subcarrier signal.

Figure 28:
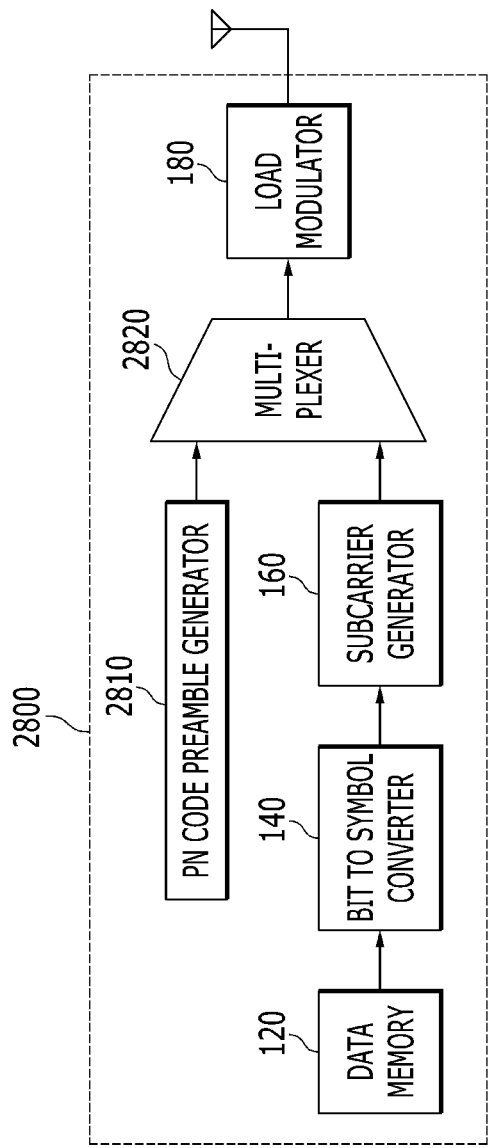
FIG. 28 is a drawing showing a tag transmission apparatus according to still another exemplary embodiment of the present invention.

FIG. 28 is a drawing showing a tag transmission apparatus according to still another exemplary embodiment of the present invention. That is, FIG. 28 is a drawing showing the tag transmission apparatus for a case in which the preamble is generated in the PN code scheme as described above.

As shown in FIG. 28, since a tag transmission apparatus 2800 has the same components as the tag transmission apparatus 100 of FIG. 1, except for a PN code preamble generator 2810 and a multiplex 2820, a description of overlapped portions will be omitted.

The PN code preamble generator 2820 generates the PN code and multiplies the generated PN code by the subcarrier, thereby generating a final PN code preamble. That is, the PN code preamble generator 2820 generates the PN code preambles as described in FIGS. 23 and 24.

The multiplexer 2820 determines whether a packet is in a preamble region or a payload region (i.e., a data region) to thereby select one of two regions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of modulating and transmitting a plurality of data bits by a tag transmission apparatus, the method comprising:
    converting the plurality of data bits into a first symbol, which is one of a plurality of symbols each including a basis waveform that has a symbol section that is distinguishable from the symbol sections of the basis waveforms included in all others of the plurality of symbols;
    multiplying the first symbol by a square-wave having a predetermined frequency to thereby generate a first subcarrier signal; and
    transmitting the first subcarrier signal to a reader,
    wherein a relationship between the number of data bits n in plurality of data bits and the number of symbols N in the plurality of symbols may be expressed as $N=2^n$, where n is a natural number greater than 2.

2. The method of claim 1, wherein
    the converting of the plurality of data bits into the first symbol includes,
    in the case in which the predetermined frequency is four times a symbol rate of the first symbol, converting two bits into the first symbol, and
    in the case in which the predetermined frequency is eight times the symbol rate of the first symbol, converting three bits into the first symbol.

3. The method of claim 1, wherein the plurality of symbols include $2^n/2$ first basis waveforms which are orthogonal to each other within a symbol section and second basis waveforms obtained by phase-reversing the first basis waveforms.

4. The method of claim 3, wherein the first basis waveform and the second basis waveform are orthogonal to each other.

5. The method of claim 1, wherein the first subcarrier signal corresponding to each of the plurality of symbols is distinguishable according to a position at which a phase is reversed within a symbol section.

6. The method of claim 5, wherein the plurality of symbols include $2^n$ basis waveforms having positions of square-pulses different from each other, and each first subcarrier signal has the number of phase reversal of one time.

7. The method of claim 1, wherein the plurality of symbols include basis waveforms which are $2^n$ square-pulses having cross-correlation of zero within a symbol section.

8. The method of claim 7, wherein the first subcarrier signal corresponding to each of the plurality of symbols is distinguishable according to a position at which the square-pulse is present.

9. The method of claim 8, wherein the first subcarrier signal has at least one time of the number of phase reversals.

10. A method of modulating and transmitting a plurality of data by a tag transmission apparatus, the method comprising:
    converting a first data bit, which is at least two bits of the plurality of data, into a first symbol;
    converting a second data bit, which is at least two bits of the plurality of data, into a second symbol;
    dividing the first symbol and the second symbol in parallel;
    multiplying the divided first symbol by a first subcarrier having a first frequency to thereby generate a first subcarrier signal;
    multiplying the divided second symbol by a second subcarrier having a second frequency to thereby generate a second subcarrier signal;
    transmitting the first subcarrier signal to a reader through a first antenna; and
    transmitting the second subcarrier signal to the reader through a second antenna.

11. The method of claim 10, wherein the first frequency and the second frequency are different frequencies from each other.

12. The method of claim 11, wherein the second frequency is two times faster than the first frequency.

13. The method of claim 10, wherein:
    the transmitting of the first subcarrier signal to the reader includes modulating the first subcarrier signal and transmitting it to the reader through the first antenna; and
    the transmitting of the second subcarrier signal to the reader includes modulating the second subcarrier signal and transmitting it to the reader through the second antenna.

14. A tag transmission apparatus, comprising:
    a data memory including a plurality of data bits;
    a bit to symbol converter converting a plurality of first data bits of the plurality of data bits into a first symbol, which is one of a plurality of symbols, each including a basis waveform that has a symbol section that is distinguishable from the symbol sections of the basis waveforms included in all others of the plurality of symbols;
    a first subcarrier generator multiplying the first symbol by a first subcarrier having a first frequency to thereby generate a first subcarrier signal; and
    a first load modulator modulating the first subcarrier signal, wherein a relationship between the number of data bits n in plurality of data bits and the number of symbols N in the plurality of symbols may be expressed as $N=2^n$, where n is a natural number greater than 2.

15. The tag transmission apparatus of claim 14, wherein the bit to symbol converter converts a plurality of second data bits of the plurality of data bits into a second symbol, which is one of the plurality of symbols, and the tag transmission apparatus further comprises:
    a demultiplexer dividing the first symbol and the second symbol in parallel;
    a second subcarrier generator multiplying the second symbol by a second subcarrier having a second frequency to thereby generate a second subcarrier signal; and
    a second load modulator modulating the second subcarrier signal.

16. The tag transmission apparatus of claim 15, wherein the second frequency is two times faster than the first frequency.

17. The tag transmission apparatus of claim 14, wherein the plurality of symbols include $2^n/2$ first basis waveforms which are orthogonal to each other within a symbol section and second basis waveforms obtained by phase-reversing the first basis waveforms.

18. The tag transmission apparatus of claim 14, wherein the first subcarrier signal corresponding to each of the plurality of symbols is distinguishable according to a position at which a phase is reversed within a symbol section.

19. The tag transmission apparatus of claim 14, wherein the plurality of symbols include basis waveforms which are $2^n$ square-pulses having cross-correlation of zero within a symbol section.

* * * * *